United States Patent

Notten et al.

[11] Patent Number: 5,970,187
[45] Date of Patent: Oct. 19, 1999

[54] ELECTRO-OPTICAL SWITCHING DEVICE

[75] Inventors: Petrus H. L. Notten; Erik P. Boonekamp; Leo H. M. Krings; Johan Van De Ven, all of Eindhoven, Netherlands

[73] Assignee: U.S. Philips Corporation, New York, N.Y.

[21] Appl. No.: 08/909,316

[22] Filed: Aug. 14, 1997

[30] Foreign Application Priority Data

Aug. 22, 1996 [EP] European Pat. Off. .............. 96202332

[51] Int. Cl.[6] ..................................................... G02B 6/26
[52] U.S. Cl. ............................ 385/16; 385/147; 204/242; 204/290 R
[58] Field of Search ............................... 204/242, 290 R; 385/16, 17, 18, 20, 21, 22, 23

[56] References Cited

U.S. PATENT DOCUMENTS

| | | | |
|---|---|---|---|
| 4,240,693 | 12/1980 | Johnson et al. | 350/96.14 |
| 4,245,883 | 1/1981 | Johnson et al. | 350/96.14 |
| 5,635,729 | 6/1997 | Griessen et al. | 257/2 |
| 5,699,462 | 12/1997 | Fouquet et al. | 385/18 |

*Primary Examiner*—Hung N. Ngo
*Attorney, Agent, or Firm*—John C. Fox

[57] ABSTRACT

A description is given of an electro-optical switching device (1) comprising a transparent substrate (3), a switching layer (5) of yttrium hydride as a first electrode, a palladium layer (7), an electrolyte layer of, e.g. $Ta_2O_5$ (9), a layer of $WO_3$ hydride as the second electrode (11), and a transparent ITO-layer (13). Under the influence of a potential difference or direct current between the electrodes (5) and (11), the yttrium hydride is electrochemically converted from a low-hydrogen-content state to a high-hydrogen-content state, or vice versa. The conversion between both compositions is reversible, and is accompanied by a change in optical transmission. Apart from Y, other trivalent metals may be used, such as Gd and La.

8 Claims, 2 Drawing Sheets

ELECTRO-OPTICAL SWITCHING DEVICE

BACKGROUND OF THE INVENTION

The invention relates to an electro-optical switching device comprising a metal-compound containing switching layer. The invention also relates to applications of such a switching device.

In the relevant switching devices, the optical properties are governed by an electric potential or current.

For example, electrochromic devices are well-known, in which a layer of an electrochromic material, such as $MoO_3$, is sandwiched between two transparent electroconductive electrode layers, for example, of indium-tin oxide. A layer of an $H^+$- or $Li^+$-ion-conducting material is present between an electrode and the electrochromic material. The device also comprises an ion-storage layer for storing said ions. The application of an electric potential of several volts across the electrodes causes the transmission or colour of the layer stack to change. Said transmission change is reversible. Electrochromic materials are used, for example, in variable-transmission windows for buildings and anti-dazzle mirrors in cars.

A drawback of oxidic electrochromic devices is that an extensive layer stack is required for their operation. A further important disadvantage is that such materials enable only a relative small transmission change, and hence a small contrast, to be attained.

In the non-prepublished international patent application IB 96/00365 (PHN 15326) filed by applicants, a switching device is described in which some trivalent metals, like Y and La, can reversibly be converted from a dihydride state into a trihydride state by supplying hydrogen. Both states have different optical and electrical properties. The dihydride state is metallic and mirror-like, whereas the trihydride state is semiconductive and transparent.

OBJECTS AND SUMMARY OF THE INVENTION

It is an object of the present invention to provide, inter alia, an electro-optical switching device in which the switching layer can be reversibly converted from a non-transparent or mirror-like state into a transparent state. Both states must be stable. In addition, it must be possible to perform said conversion relatively rapidly at ambient temperature and atmospheric pressure, and at low voltages, i.e. less than 10V. Besides, the switching device should have a simple layer structure, and must show a high contrast.

In accordance with the invention, this object is achieved by an electro-optical switching device which comprises a first and a second electrode separated by an ion-conducting electrolyte, the first electrode comprising a switching layer of a hydride of a trivalent transition or rare earth metal, which switching layer is provided with an electrocatalytic metal film, and which film is in contact with the electrolyte, so that by applying a potential between the electrodes a change in the optical transmission of the switching layer is detectable when the metal hydride is electrochemically converted from a low-hydrogen-content mirror-like state to a high-hydrogen-content transparent state by an exchange of hydrogen, and vice versa.

It has been found that some trivalent metals in a thin layer can form hydrides with hydrogen, which hydrides can be in the metallic state and in the semiconductive state, dependent upon the hydrogen content. In the metallic state, the thin layer, i.e. the switching layer, is non-transparent and reflective or mirror-like, whereas in the semiconductive state the switching layer is transparent.

If, e.g. a thin gadolinium switching layer is exposed at room temperature to atomic hydrogen, the hydride phase $GdH_x$ is formed. At a low hydrogen content ($x<\approx2$), the film has a metallic character, and is non-transparent. At sufficiently high hydrogen pressures (>1 mbar), the hydrogen-rich composition ($x>\approx2$) is formed. Said hydrogen-rich layer ($x>\approx2$) formed is transparent and of a yellow colour in transmission. The transition from mirror-like to transparent is reversible.

Similar phenomena can be observed with an yttrium layer. At a low hydrogen concentration, a non-transparent dihydride composition having an existence range around $YH_2$ is formed, whereas at higher hydrogen concentrations a transparent trihydride composition having an existence range around $YH_3$ seems to be formed. Although the exact compositions depend on the metal and on certain conditions, the designations dihydride and trihydride will be used in the following part of this document for the low-hydrogen-content state and high-hydrogen-content state, respectively. Apart from Y and Gd, other trivalent transition and rare earth metals exhibit similar phenomena. Among these metals are, e.g. scandium (Sc) and lanthanum (La). Transparent yttrium trihydride is yellow in transmission, whereas transparent lanthanum trihydride is red. Alloys of these metals are also possible, e.g. an Y—La alloy, or alloys with divalent metals in order to influence the colour and improve the stability, switching velocity and contrast of the layer.

The switching layer in accordance with the invention is thin, i.e. its thickness is less than 2 $\mu$m. The layer thickness of the switching layer preferably ranges between 100 and 1,000 nm. As hydrogen must diffuse in the switching layer, the layer thickness determines the rate of full conversion from the metallic to the transparent composition, and conversely.

The electro-optical device according to the invention is an electrochemical cell in which one of the electrodes comprises a switching layer of a hydride of the trivalent metal, which is in contact with an ion-conducting electrolyte via a thin catalytic metal film.

Hydrogen-charging of the metal hydride or switching layer is obtained by electrolytic reduction of protons or hydrogen-containing molecules, such as water, by applying a potential between the electrodes. At this electrode/electrolyte interface protons are reduced to atomic hydrogen. The generated atomic hydrogen (H) will convert the metal dihydride to the trihydride state. The electrode comprising the metal hydride will change from mirror-like to transparent. Changing the potential to more positive values leads to oxidation of the trihydride into the dihydride state. The electrode will again become mirror-like. In this way a reversible electro-optical switch is obtained.

In order to promote the speed of hydriding and dehydriding, and thus the switching speed, the metal hydride-containing switching layer is provided with a thin film of an electrocatalytic metal or alloy, such as palladium, platinum or nickel. These metals catalyse inter alia the reduction of protons to hydrogen. Other suitable catalytic metals are the alloys of the so-called $AB_2$ and $AB_5$ type, such as $TiNi_2$ and $LaNi_5$. In addition, this metal film protects the underlying switching layer against oxidation by the electrolyte. This film has a thickness, for example, of 5 nm. At said thickness, the film is discontinuous or island-like. The layer thickness is not critical and is chosen to be in the range between 2 and 25 nm. However, thin layers of 2 to 10 nm are preferred because the thickness of the film determines the maximum transmission of the switching device. In case of a palladium film thickness of 10 nm, the maximum transmission is 15 to 20%. In the reflective mode of the device, the palladium film may be thicker, e.g. 50 nm. The thickness of the electrocatalytic metal film and its metal determine the switching speed of the switching device.

The electrolyte must be a good conductor of ions, but an insulator of electrons in order to prevent self-discharge of the device. For the electrolyte liquid use can be made of electrolytes, such as an aqueous solution of KOH. Such a solution is a good ion conductor, and the metal hydrides contained therein are stable. The electrolyte may also be present in the gel state.

There is a strong preference for transparent solid-state electrolytes, because of the simplicity of the device; it prevents sealing problems and is easier to handle. Both solid inorganic and organic compounds can be used. Examples of inorganic electrolytes are hydrated oxides like $Ta_2O_5.nH_2O$, $Nb_2O_5.nH_2O$, $CeO_2.nH_2O$, $Sb_2O_5.nH_2O$, $Zr(HPO_4)_2.nH_2O$ and $V_2O_5.nH_2O$, $H_3PO_4(WO_3)_{12}.29H_2O$, $H_3PO_4(MoO_3)_{12}.29H_2O$, $[Mg_2Gd(OH)_6]OH.2H_2O$, and anhydrous compounds such as $Mg(OH)_2$, $KH_2PO_4$, $KH_2AsO_4$, $CeHSO_4$, $CeHSeO_4$, and compounds of the type $MCeO_3$ (M=Mg, Ca, Ba, Sr), in which a part of Ce has been substituted by $Y_b$, Gd or Nb. Also glasses may be used, such as alkali-free zirconium phosphate glass. These compounds are good proton ($H^+$) conductors. Examples of good ion ($H_3O^+$) conductors are $HUO_2PO_4.4H_2O$ and oxonium β-alumina. An example of a solid organic electrolyte is poly(2-acrylamido-2-methyl-propane-sulphonic acid).

Various transparent materials can be used for the counter or second electrode. Examples are hydrogenated oxidic materials such as $WO_3$, $NiO_z$, $Rh_2O_3$ and $V_2O_5$. Said materials can be charged with hydrogen by sputtering in a hydrogen atmosphere or by electrochemical means in a separate step. Also thin layers of hydride-forming intermetallic $AB_2$ and $AB_5$ compounds, such as $TiNi_2$ and $LaNi_5$, can be used. It is aternatively possible to use the same material as that used for the switching layer, provided that when the switching layer is in the dihydride state, the second electrode is in the trihydride state, and vice versa. Said materials are provided in the form of a layer with a thickness comparable with that of the switching layer. The thickness is chosen in such a way, that the hydrogen capacity in the second electrode is sufficient to convert the switching layer from the dihydride state to the trihydride state, and vice versa.

Substrates onto which the layers of the switching device may be provided are transparent materials, such as glass, quartz, diamond, aluminium oxide or (flexible) synthetic resin. The substrate may be plane or curved.

The switching layer is applied as a thin layer to the substrate by means of conventional methods, such as vacuum evaporation, sputtering, laser ablation, chemical vapour deposition or electroplating. In this respect, it is important that during and after application of the switching layer, the metal of the switching layer is not subject to oxidation. In a vacuum-evaporation process, this is achieved by maintaining the pressure, in particular, of the residual gases water and oxygen, at a low level below $10^{-6}$ to $10^{-7}$ mbar.

The catalytically active layer, for example, of Pd, and the layer of the second electrode, can likewise be applied by means of one of the above-mentioned methods.

The inorganic solid-state electrolyte can also be applied as a thin layer by one of the above-mentioned methods. Inorganic oxidic electrolytes may also be manufactured by a sol-gel process, a suitable alkoxy compound being used as the starting material. Organic electrolytes may be applied, e.g. by spin coating.

As thin layers of metal hydrides have a sufficient electrical conductance, a thin transparent layer of indium-tin oxide between the substrate and the switching layer, which is customary in conventional electrochromic devices, may be omitted. In this way, the switching device according to the invention is simpler than a conventional electrochromic display.

Examples of possible layer sequences in an electro-optical switching device according to the invention are:

A. substrate | $YH_x$ | Pd | aqueous KOH | $H_yNiO_z$ | ITO

In this configuration $YH_x$ is initially in the dihydride state (x≈2), whereas the nickel oxide is charged with hydrogen: $H_yNiO_z$ ($1 \leq y,z \leq 2$). The $YH_x$ switching layer, which serves as the first electrode, is mirror-like and non-transparent, and the $H_yNiO_z$ layer, which serves as the second electrode, is transparent. When a negative potential is applied to the $YH_x$ layer, H is transferred from the nickel oxide layer through the electrolyte to the $YH_x$ layer. $YH_x$ is converted to $YH_{x+\delta}$ (trihydride state; x+δ≈3), which is transparent, whereas $H_{y-\delta}NiO_z$ becomes neutral grey: the device has become transparent in this state, or is switched from the mirror state to the transparent state, provided the Pd film is thin (<5 nm). The switching process is reversible. When a positive potential is applied to the $YH_{x+\delta}$ layer, H is transferred back to the $H_{y-\delta}NiO_z$ layer through the electrolyte, and the device becomes mirror-like and non-transparent again. This switching process can be repeated many times, and takes place at a low voltage below 1V.

In the reflective mode a thick Pd film (about 50 nm) is used. The Pd film is intrinsically reflective. However, this Pd film can only be observed from the substrate side, when the $YH_x$ is in the transparent trihydride state. In the non-transparent dihydride state, the Pd film can not be observed anymore.

The contrast of such a device is higher than that of a conventional electrochromic device. By changing from the trihydride state to the dihydride state, the transmission decreases from about 20% to about 1%, ie. a contrast of (20−1)/1=19. In a conventional electrochromic device in which $Li_xWO_3$ is used as a switching layer of the same thickness as the yttrium hydride layer, the transmission changes from fully transparent ($WO_3$) to about 25%, i.e. a contrast of only (100−25)/25=3.

B. substrate | $YH_x$ | Pd | $Ta_2O_5.H_2O$ | $H_yWO_3$ | ITO

This device, which has a inorganic solid-state electrolyte, operates in the same way as the device under A, and switching takes place at a voltage below 2V. Protons are now transported through the solid electrolyte.

ITO (indium tin oxide) serves as a transparent, conducting electrode. Instead of ITO use can be made of $SnO_2$ doped with F, which material is more stable than ITO.

As the switching device in accordance with the invention can be switched from a metallic, non-transparent state to a transparent, semiconductive state, and conversely, it can be used in many applications. By virtue of this optical effect, the switching device can be used as an optical switching element, for example as a variable beam splitter, and for controlling the illuminance or the shape of light beams in luminaires. Dependent upon the film thickness of the switching layer, this layer can exhibit almost zero transmission in the metallic state. This enables a switching device having a great contrast to be manufactured. The switching device can be used in applications in which electrochromic layers are presently being used, such as architectural glass, vision control glass, sun roofs and rear-view mirrors.

The switching device in accordance with the invention can also be used as a variable transmission filter on or in front of a display screen to improve the contrast of the picture.

By making a pattern in the metal hydride layer, a thin display can be manufactured. The construction of such a display is much simpler than that of an LCD (liquid crystal display) due to the absence of an LC layer, orientation layer, retardation layer and polarization filter. By using three different metals of the metal hydride, a three-colour dotted pattern can be obtained.

BRIEF DESCRIPTION OF THE DRAWINGS

These and other aspects of the invention will be apparent from and elucidated with reference to the embodiments described hereinafter.

In the drawings.

DESCRIPTION OF THE PREFERRED EMBODIMENTS

Exemplary Embodiment 1

Figure 1:
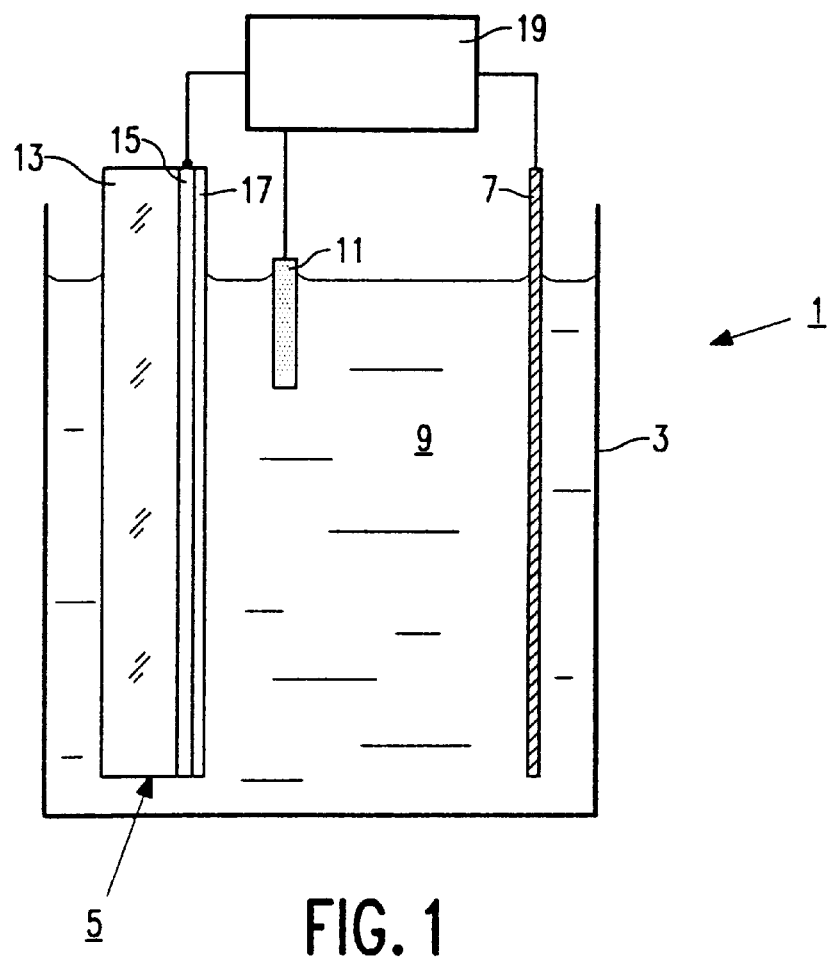
FIG. 1 is a schematic cross-sectional view of an electrochemical cell in accordance with the invention, FIG. 2 show a dynamic current-potential (A) and corresponding transmission T measurement (B) of an electrode layer according to the invention.

FIG. 1 diagrammatically shows an electrochemical test cell 1 for testing electro-optical switching layers. The layer thicknesses in this Figure are not drawn to scale. Reference numeral 3 denotes a glass cuvette which accommodates an electrode sample 5, a platinum counter electrode 7, an electrolyte 9 and a reference electrode 11.

The sample 5 comprises a polished quartz substrate 13, which is provided with a 200 nm thick yttrium hydride layer 15 as a switching layer by means of electron-beam evaporation. The residual pressure in the evaporation apparatus is less than $10^{-7}$ mbar. In the same apparatus, a 10 nm thick palladium film 17 is evaporated onto the switching layer 15. By filling the apparatus with hydrogen at a pressure of $10^{-2}$ mbar, the yttrium is converted to the dihydride state, which has a mirror-like appearance and is non-transparent.

For the electrolyte 9 use is made of an aqueous solution of 6 mol/l KOH at room temperature. The reference electrode 11 is a Hg/HgO electrode.

The electrodes are electrically connected to a potentiostat 19.

The optical transmission T of the sample 5 is investigated by illuminating the sample from the back and detecting the light intensity at the front, using a red light source in combination with a photodetector.

Figure 2A:
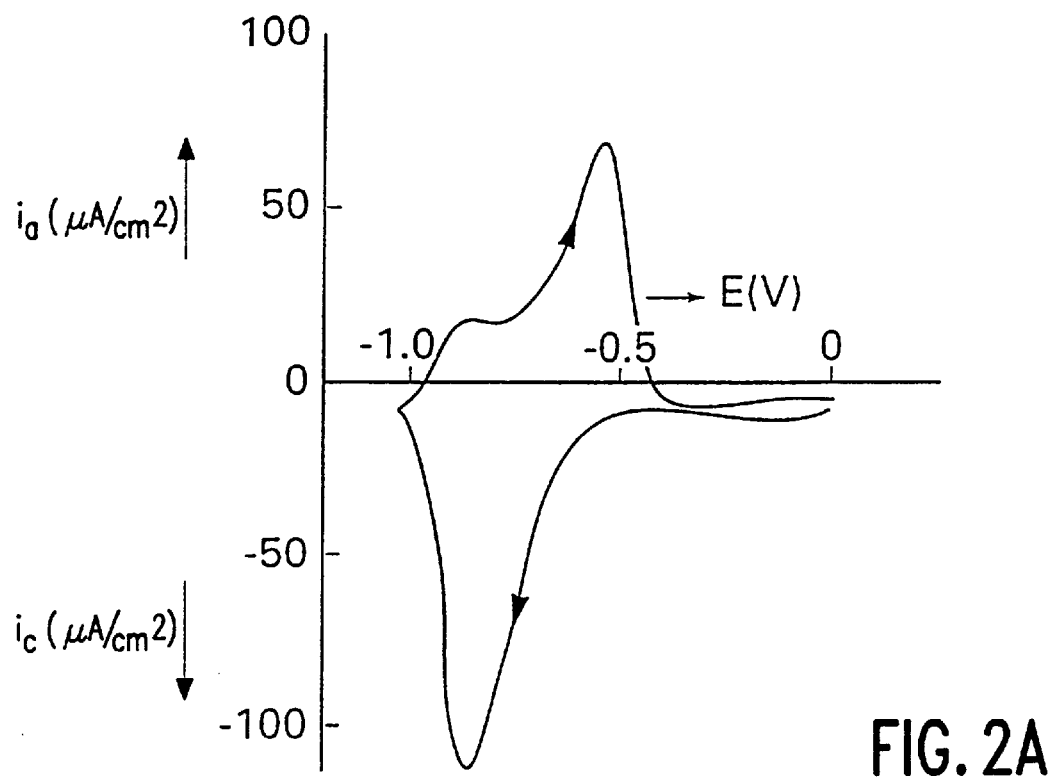
Figure 2B:
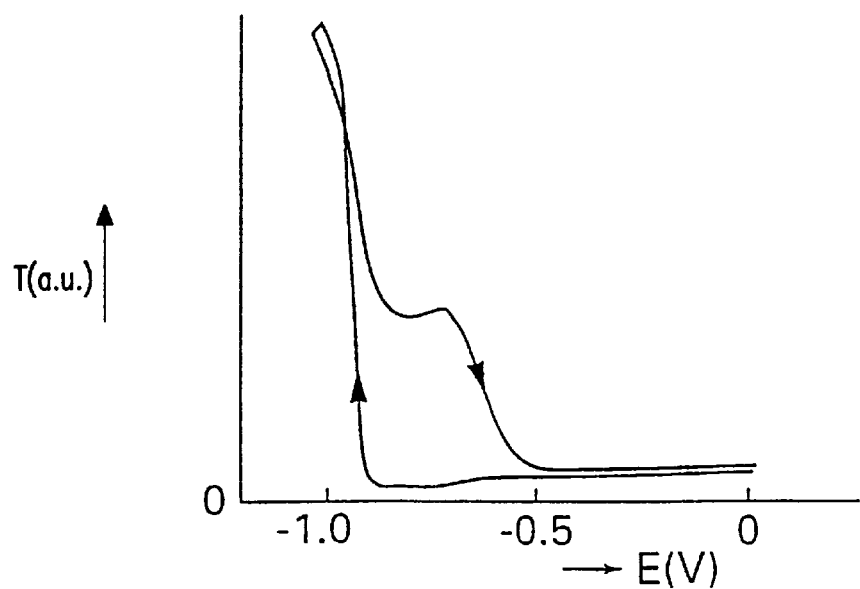

FIG. 2 shows the result of a dynamic current-potential experiment. The arrows in the curves denote the direction of potential scanning. FIG. 2A shows the relation between the electrode potential E (in V) of the switching layer and the current density i (in $\mu A/cm^2$). FIG. 2B shows the transmission T (in arbitrary units a.u.) of the sample as a function of the potential E. Using non-transparent yttrium dihydride, the electrode potential is scanned, from an initial value of E=0V, towards more negative values with a scan rate 0.1 mV/s. In this negative potential region water reduction to H occurs. The cathodic current density $i_c$ starts to rise at −0.6 V and finds its maximum at −0.85 V. In this region the electrode becomes transparent by conversion from the dihydride state to the trihydride state (FIG. 2B).

If the scanning direction is reversed, oxidation from the trihydride state to the dihydride state takes place, which is indicated by an anodic current density $i_a$ (FIG. 2A). The transparent electrode becomes non-transparent again (FIG. 2B). In this way a reversible electro-optical switching device is obtained. The switching time is comparable with that of conventional electrochromic devices.

Exemplary Embodiment 2

An electro-optical switching device according to the invention is made, which is similar to that shown in FIG. 1, except for the platinum counter electrode 7 which, in this embodiment, is now replaced by a glass plate provided with an electroconductive indium-tinoxide (ITO) layer. The ITO layer is provided with a 150 nm thick layer of HNiO as the second electrode. Both layers are obtained by sputtering, the second layer being obtained by sputtering in a hydrogen atmosphere. The switching behaviour of this device has been described above. The switching time is comparable with that of conventional electrochromic devices.

Exemplary Embodiment 3

Figure 3:
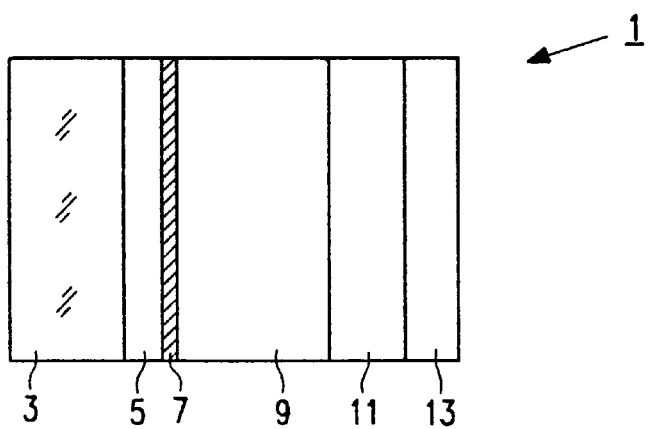
FIG. 3 shows an electro-optical solid-state device according to the invention.

FIG. 3 schematically shows a cross-section of a solid-state electro-optical switching device 1 according to the invention. The layer thicknesses are not drawn to scale.

The device comprises a glass plate 3, a first electrode 5 of yttrium dihydride as a switching layer with a thickness of 200 nm, a palladium layer 7 with a thickness of 5 nm, a layer 9 of a solid-state electrolyte of $Ta_2O_5.H_2O$ which conducts protons and which has a thickness of 500 nm, a second electrode 11 of transparent blue $HWO_3$ with a thickness of 350 nm, and an electroconductive ITO layer 13. All layers are transparent, except for layer 5 in the dihydride state, so that the device 1 is non-transparent when observed in transmission.

The device operates at room temperature. Layers 5 and 13 are connected to an external current source. By applying a cathodic DC current to the first electrode 5, the dihydride state is converted to the trihydride state, which is transparent. $HWO_3$ of the second electrode 11 changes from blue to transparent $WO_3$. The device 1 is now transparent and yellow when observed in transmission. When reversing the current, the first electrode 5 returns to the dihydride state which is mirror-like and non-transparent, and the second $WO_3$ electrode 11 becomes blue again due to the formation of $HWO_3$. The device 1 has been switched to the non-transparent state when observed in transmission.

The electro-optical switching device in accordance with the invention, which comprises a switching layer of a hydride of a trivalent metal, such as yttrium or gadolinium, can be reversibly converted from a mirror-like, non-transparent state to a transparent state by electrochemical conversion. Said conversion takes place very rapidly at room temperature, and at low voltage. Said switching device can be used, inter alia, as an optical switching element, in rear-view mirrors, sun roofs, architectural glass, vision control glass, displays and for display screens with variable transmission.

We claim:

1. An electro-optical switching device comprising a first and a second electrode separated by an ion-conducting electrolyte, the first electrode comprising a switching layer of a hydride of a trivalent transition or rare earth metal, which switching layer is provided with an electrocatalytic metal film, which film is in contact with the electrolyte, so that by applying a potential or current between the electrodes a change in the optical transmission of the switching layer is detectable when the metal hydride is electrochemically converted from a low-hydrogen-content mirror-like state to a high-hydrogen-content transparent state by an exchange of hydrogen, and vice versa, characterized in that the electrolyte comprises an aqueous solution of KOH.

2. A device according to claim 1, characterized in that the metal of the switching layer is selected from the group consisting of Y, La and Gd, or an alloy of these elements.

3. A device according to claim 1, characterized in that the catalytic metal film comprises palladium.

4. A device according to claim 1, characterized in that the second electrode is a transparent layer comprising a hydride of nickel oxide.

5. A device according to claim 1, characterized in that the second electrode is a transparent layer comprising a hydride of tungsten oxide.

6. An electro-optical switching device comprising a first and a second electrode separated by an ion-conducting electrolyte, the first electrode comprising a switching layer of a hydride of a trivalent transition or rare earth metal, which switching layer is provided with an electrocatalytic metal film, which film is in contact with the electrolyte, so that by applying a potential or current between the electrodes a change in the optical transmission of the switching layer is detectable when the metal hydride is electrochemically converted from a low-hydrogen-content mirror-like state to a high-hydrogen-content transparent state by an exchange of hydrogen, and vice versa, characterized in that the electrolyte comprises a solid state electrolyte.

7. A device according to claim 6, characterized in that the electrolyte is an inorganic solid-state electrolyte.

8. A device according to claim 7, characterized in that the electrolyte comprises $Ta_2O_5$.

* * * * *